Aug. 3, 1926.

C. F. PLUNKETT 1,595,021

WATER GAUGE

Filed April 8, 1924

INVENTOR
Christopher F. Plunkett
BY
Howson and Howson
his ATTORNEYS

Patented Aug. 3, 1926.

1,595,021

UNITED STATES PATENT OFFICE.

CHRISTOPHER F. PLUNKETT, OF NEW YORK, N. Y.

WATER GAUGE.

Application filed April 8, 1924. Serial No. 705,083.

My invention relates to water gauges in which there is a glass tube showing the level of the liquid, and the object of my invention is to provide simple and practical means for cleaning the inside of the glass tube.

It has always been difficult to keep the inside of glass tubes used to indicate the water level in boilers or coffee urns, from becoming so discolored that the level of the water cannot be seen.

One difficulty with glass tube water gauges, which has not yet been satisfactorily overcome, is the discoloration on the inside of the tube which prevents the gauge being read. Various complicated forms of valves have been devised to permit removal of the glass tube through the valve or to permit the introduction of a cleaning device. Many of these constructions involved an opening so located that the stem of the ordinary valve would have blocked access to the tube. All the prior constructions have involved such complicated and expensive castings or valve mechanisms that none are to be found on the market.

My invention consists in so locating an opening in the chamber of the ordinary valve that a cleaning implement will pass under the valve stem and into the tube with perfect ease and simplicity. The opening is so located that anyone can comprehend its use and no change of any valve mechanism is involved nor is the casting for the valve complicated.

In the drawings—

Figure 1:
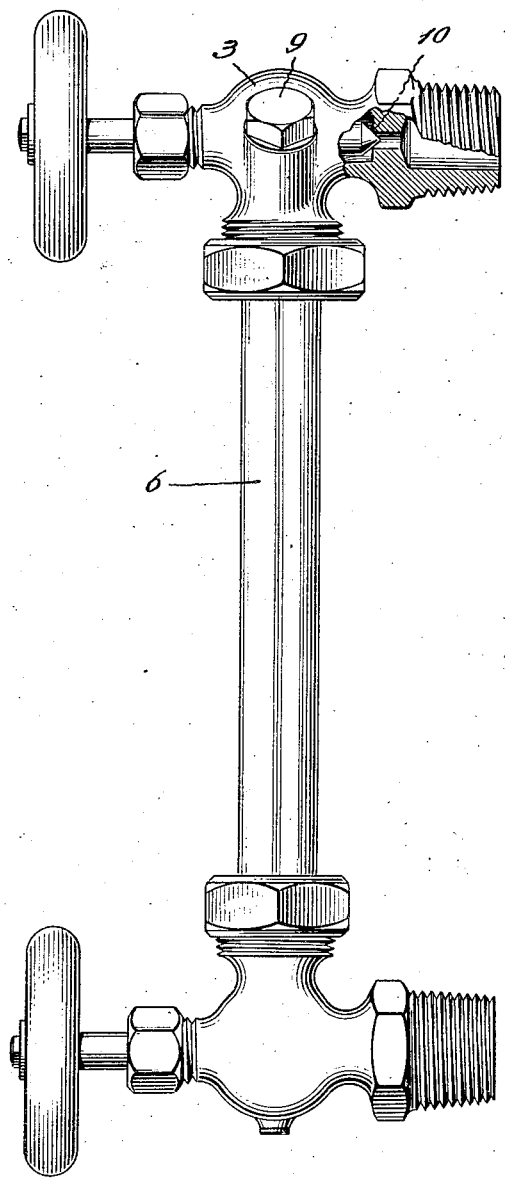
Fig. 1 is a side elevation of a gauge embodying my invention.
Figure 2:
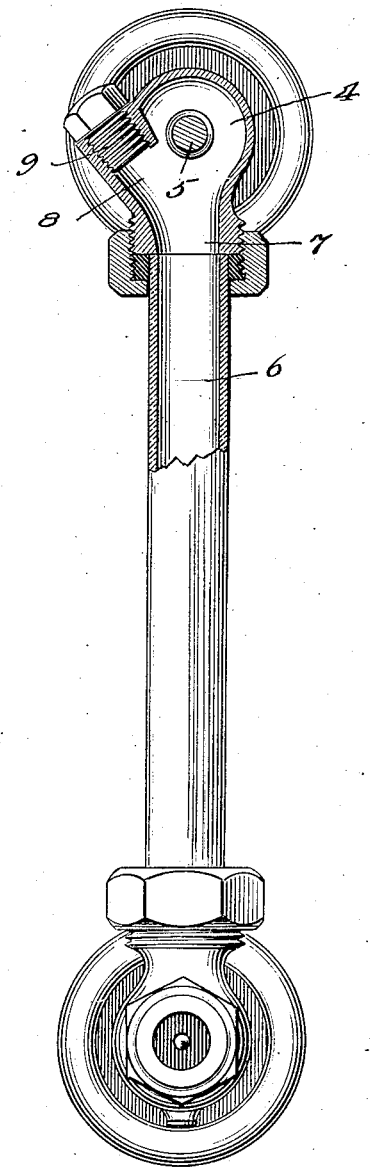
Fig. 2 is an elevation at right angles to Fig. 1 with the valve in section.

The gauge consists of the two usual cut off valves 3 and the glass tube 6 connected between them. The valve chamber 4 of the upper valve has a valve stem 5 passing through the middle of it horizontally. The glass tube 6 is connected to the lower part of the valve chamber 4 by an opening 7. It will be noted that the valve stem lies across the opening. I provide an opening 8 so located in the wall of the valve chamber that any cleaning instrument inserted through the hole passes to one side of the valve stem and to the opening 7 freely. This opening is preferably located below the horizontal line of the valve stem and inclined at such an angle that a cleaning instrument can pass into the glass tube without having to pass too sharp a corner. In the drawing this opening has been shown offset to one side of the valve stem. To close the hole when not in use I provide a threaded plug screwing into threads in the opening.

When it is desired to clean the tube, the valve stems 5 are screwed down on to the valve seats 10 thus shutting off the liquid in the boiler temporarily and the plug 9 removed. The cleaning instrument is then inserted through the hole 8 and by simply being forced in will be guided into the glass tube 6 and clean the latter.

What I claim is:—

1. A water gauge valve having a valve chamber in which there is an opening adapted to be connected to an indicating tube, and a valve stem lying across the opening, said valve being provided with closable opening in the side of the wall of said chamber affording direct access to said indicating tube, to one side of the valve stem.

2. A water gauge valve having an indicating tube attached thereto, a valve chamber with a closable inclined opening in said chamber which affords direct access to said indicating tube to one side of the valve stem, said valve stem lying across the end of the tube.

In testimony whereof I have signed my name to this specification.

CHRISTOPHER F. PLUNKETT.